United States Patent
Nguyen

[11] Patent Number: 5,836,694
[45] Date of Patent: Nov. 17, 1998

[54] LASER AND SCOPE AIMING MECHANISM FOR A HAND-HELD TEMPERATURE MEASURING UNIT

[75] Inventor: Phan Nguyen, Pacifica, Calif.

[73] Assignee: Raytek Subsidiary, Inc., Santa Cruz, Calif.

[21] Appl. No.: 761,337

[22] Filed: Dec. 10, 1996

[51] Int. Cl.⁶ ................................ G01J 5/08; G01J 5/62
[52] U.S. Cl. .................... 374/130; 374/141; 374/121; 356/399; 33/DIG. 21; 362/259; 250/491.1
[58] Field of Search ..................... 374/130, 121, 374/141, 124; 600/474, 549; 356/49, 399; 33/241, DIG. 21; 362/35, 259; 250/491.1

[56] References Cited

U.S. PATENT DOCUMENTS

| | | | |
|---|---|---|---|
| 4,315,150 | 2/1982 | Darringer et al. | 374/124 |
| 4,402,311 | 9/1983 | Hattori | 600/549 |
| 4,560,286 | 12/1985 | Wichersheim | 374/131 |
| 4,607,963 | 8/1986 | Ulrickson | 374/131 |
| 4,617,438 | 10/1986 | Nakata | 374/121 |
| 4,708,494 | 11/1987 | Kleinerman | 374/161 |
| 5,021,980 | 6/1991 | Poenisch et al. | 374/120 |
| 5,085,525 | 2/1992 | Bartosiak et al. | 374/124 |
| 5,145,257 | 9/1992 | Bryant et al. | 374/131 |
| 5,169,234 | 12/1992 | Böhm | 374/128 |
| 5,235,399 | 8/1993 | Usui et al. | 374/121 |
| 5,263,776 | 11/1993 | Abraham et al. | 374/161 |
| 5,322,361 | 6/1994 | Cabib et al. | 374/161 |
| 5,365,065 | 11/1994 | Power | 374/124 |
| 5,388,907 | 2/1995 | Aoyama et al. | 374/130 |
| 5,419,312 | 5/1995 | Arenberg et al. | 600/539 |
| 5,445,157 | 8/1995 | Adachi et al. | 600/549 |
| 5,524,984 | 6/1996 | Hollander et al. | 374/121 |
| 5,539,673 | 7/1996 | Charm et al. | 374/121 |
| 5,613,777 | 3/1997 | Ridley et al. | 374/130 |

OTHER PUBLICATIONS

The Infrared Temperature Handbook by Omega Engineering, Inc., pp. 18–19 (1994). No month.
Product Literature for Rayteck "Noncontact Thermocouple," 2 pages. (No Date).
Product Literature for Rayteck "Raynger II Plus," 2 pages. (1988). (No month).

*Primary Examiner*—Diego F. F. Gutierrez
*Attorney, Agent, or Firm*—Townsend and Townsend and Crew LLP

[57] ABSTRACT

A system for aiming a remote IR temperature sensing device includes a laser aiming assembly and a scope assembly mounted to the IR temperature sensing device. The laser aiming assembly provides for adjusting the vertical and azimuthal positions of an alignment beam to facilitate the use of inexpensive, low-tolerance parts while providing high accuracy to improve sensitivity, accuracy, and resolution. The laser aiming assembly includes a laser aiming mirror for directing the alignment beam toward the target. The system includes a beam splitter which reflects incoming visible radiation toward the scope assembly and allows incoming IR radiation to pass through to an IR temperature sensor. The beamsplitter has an opening of sufficient size to allow the alignment beam to pass through unobstructed but not so large as to interfere with the operation of the beamsplitter. The scope assembly provides for magnifying the focal area of the system for enhanced viewing by the user and additionally provides for more efficient and accurate temperature measurement.

12 Claims, 2 Drawing Sheets

LASER AND SCOPE AIMING MECHANISM FOR A HAND-HELD TEMPERATURE MEASURING UNIT

BACKGROUND OF THE INVENTION

The present invention relates generally to non-contact infrared temperature sensors, and more specifically to the field of aiming systems for non-contact infrared temperature sensors. Non-contact infrared temperature sensors, or radiometers, advantageously do not require surface contact. Instead, they use an infrared sensor which receives infrared energy from a target area on the surface of an object where a temperature reading is desired. Appropriate electronics connected to the infrared sensor determine the temperature of the target area.

Infrared sensors have a focal distance, or length, and a focal area which are based on the optical properties of the infrared sensor and its associated optics. The focal length and focal area, which is usually circular, are selected based on the particular application.

Aiming systems for infrared temperature sensors are desirable to allow the user to properly position the temperature sensor to obtain a temperature reading from a desired target area. As the distance between the user and the desired target area increases, the desirability of a reliable aiming system also increases.

Today there are aiming systems which use visible light for targeting. One such system, disclosed in U.S. Pat. No. 4,315,150, discloses a laser beam to provide accurate positioning. While such a system is helpful, it may be difficult to view the "dot" created by the laser beam reflected off of the target. This is especially true where the distance to the target is great. Such a system, by necessity, depends on the human eye to detect the visible light, or dot, used for targeting. Therefore, as the distance to the target increases, it becomes more and more difficult for the user to locate the visible light reflected off of the target. For example, in the situation where an electrician is attempting to measure, from the ground, the temperature of a transformer high up on a power line, it may be difficult for the electrician to locate or see the dot created by the laser beam. Use of a scope would alleviate this problem as it would allow the user to better locate the dot, and more efficiently and accurately measure the temperature of a distant object.

Accordingly, there is need in the art for a simple, accurate system for aligning beams to define the focal area of the sensor on the target and for improving the ability of an operator to locate visible light reflected from the target area.

SUMMARY OF THE INVENTION

The present invention solves the problem with known aiming systems by providing a scope assembly, beam splitter assembly and mirror assembly. According to one aspect of the invention, a beam splitter assembly and mirror assembly are provided and are adjustably mounted to the temperature sensor so that the aiming system can be adjusted according to the particular focal length of the infrared sensor. Thus, a number of different infrared sensors having different focal lengths and focal areas can be used without requiring different structural arrangements.

According to another aspect of the invention, a temperature measuring device is provided for measuring the temperature of a distant target area. The temperature measuring device includes an infrared (IR) temperature sensor including an IR detector and a first focusing element for focusing incoming IR radiation emitted from the target onto said IR detector, a scope including an eyepiece and a second focusing element for focusing incoming visible radiation reflected from the target onto said eyepiece, and a visible light source for emitting a visible beam of light, with said visible beam of light being incident upon the target.

According to another aspect of the invention, an IR temperature sensor includes a beam splitter that splits a visible light beam into two different portions which are used for targeting. The adjustable beam alignment system can be used to direct the beams to converge at a focal spot for a short focus sensor or to define the limits of a divergent beam for a long focus sensor. Additionally, the IR sensor includes a scope assembly which includes a lens system that can be used to focus incoming visible light from the focal area. Incoming visible light is reflected by a second beam splitter situated in the sensor housing toward the scope assembly, and incoming infrared radiation is transmitted through the second beam splitter to be received by the IR detector. The visible light received by the scope assembly from the second beam splitter is then reflected by a second mirror into the lens system where it is focused for viewing by the operator.

According to yet another aspect of the invention, a laser aiming system and a scope assembly are provided. The scope assembly includes a lens system that can be used to focus incoming visible light from the focal area. Incoming visible light is reflected by a beam splitter situated in the sensor housing toward the scope assembly, and incoming infrared radiation is transmitted through the beam splitter to be received by the IR detector. A first mirror then reflects the visible light received by the scope assembly from the beam splitter into the lens system where it is focused for viewing by the operator. The laser aiming system includes a second adjustable mirror situated in the housing along the optical axis, which provides for aiming the laser beam toward the target along the optical axis through a small opening in the beam splitter aligned with the optical axis.

Other features and advantages of the invention will become apparent in view of the following detailed description and appended drawings.

DESCRIPTION OF THE PREFERRED EMBODIMENT

The invention will now be described with reference to the preferred embodiments. The same or like elements will be given the same reference numbers throughout the several views.

Figure 1:
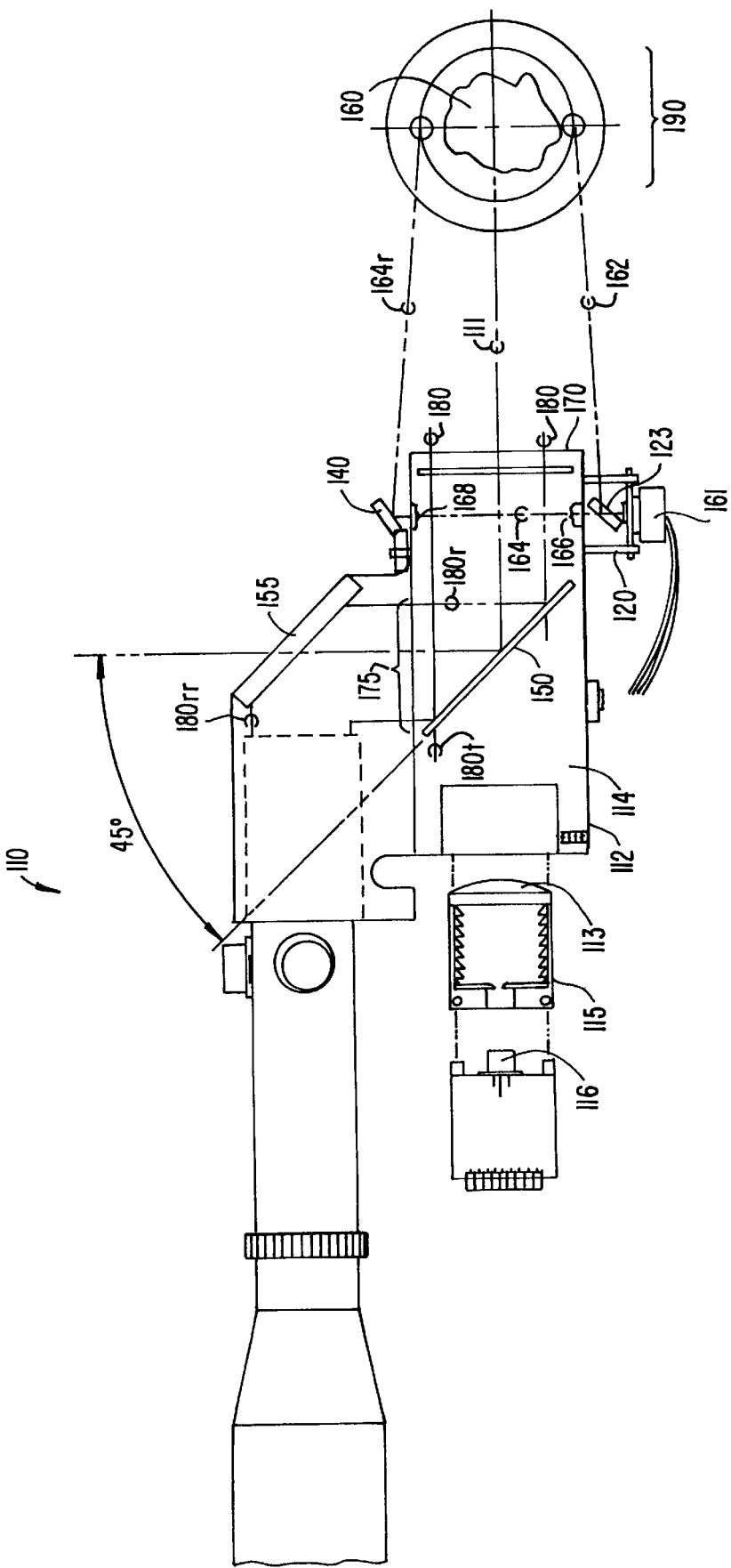
FIG. 1 depicts a cross-sectional view of a preferred embodiment of an assembled system utilizing the principles of the present invention.

FIG. 1 depicts a cross-sectional view of a preferred embodiment of an assembled system utilizing the principles of the present invention. A remote infrared (IR) thermometer 110 includes a rectangular cylindrical housing 112 including a cavity 114 holding a detector lens 113, an infrared detector 116, and a detector focusing heatsink 115. A laser focusing system includes a beam splitter assembly 120 and an adjustable mirror element 140. A scope assembly includes a beam splitter 150, a mirror element 155 and a scope lens system including an eyepiece (not shown). The beam splitter 150, mirror element 155, scope lens system, beam splitter assembly 120 and adjustable mirror element 140 will be described in detail below.

The operation of beam splitter 150 will now be described. Incoming radiation, depicted in FIG. 1 as incident radiation beam 180 (shown as two non-focused beams for the sake of simplicity), includes both visible radiation, or light, reflected off of target 160, as well as infrared radiation emitted from target 160. When sensor 110 is pointed so that optical axis 111 intersects target 160, incoming radiation from target 160 traverses opening 170 in housing 112, and is incident on beam splitter 150. Beam splitter 150 is mounted in cavity 114 and is oriented so as to reflect a portion of incoming radiation 180 through opening 175 in housing 112 as reflected radiation beam 180r. The remaining portion of incident radiation 180 passes through beam splitter 150 as transmitted radiation beam 180t. Because the transmittance and reflectance properties of beam splitter 150 will vary depending on the wavelength (or frequency) of the incident radiation, the angle of orientation of beam splitter 150 with respect to incident radiation and the material forming beam splitter 150, beam 180r and beam 180t will typically comprise different amounts of visible radiation and infrared radiation.

Beam splitter 150, in the preferred embodiment, is made out of silicon and oriented at a 45 degree angle with respect to incoming radiation beam 180 as shown in FIG. 1. At this angle, beam splitter 150 provides an average transmittance of greater than 65% for infrared radiation (roughly 7 to 14 micron wavelength) and an average reflectance of greater than 26% for visible radiation (roughly 0.4 to 0.7 micron wavelength). Therefore, in the preferred embodiment, greater than 26% of the incoming visible radiation received from target 160 is reflected through opening 175 toward mirror element 155 in radiation beam 180r. Likewise, greater than 65% of the incoming infrared radiation received from target 160 is transmitted or passed through beam splitter 150 in radiation beam 180t.

In the preferred embodiment, mirror element 155 is oriented at 45 degrees from horizontal as shown in FIG. 1. Reflected beam 180r traverses opening 175 to be reflected by mirror element 155 as reflected beam 180rr directed toward the scope lens system (not shown). The scope lens system is designed to allow a user to view, through an eyepiece, the visible light received from target 160 and reflected by beam splitter 150 and mirror element 155. A circle and cross-hair arrangement 190, as well known in the art, is included in the scope lens system to allow the operator to align optical axis 111 of sensor 110 with target 160. Furthermore, the scope lens system is designed to allow a user to view target 160 while either holding the thermometer and scope housing at arms length or with the user's eye next to the eyepiece. This is accomplished by appropriate magnification and focusing in the scope lens system of light received from target 160. When the illuminating spot on target 160 is not visible to the naked eye, the scope can be used to magnify the focal area, thereby allowing accurate location of the spot. Accordingly, the operator can accurately position IR thermometer 110 so that the IR radiated from the target 160 is focused on the IR detector 116.

In operation, when target 160 is aligned with optical axis 111 of IR thermometer 110, infrared radiation emitted from target 160 and contained in incoming radiation beam 180 is focused by the detector lens 113 onto the surface of infrared detector 116. In the preferred embodiment, the detector lens 113 is designed to provide focusing of the incoming infrared radiation (7 to 14 micron wavelength). Any visible radiation passing through beam splitter 150 is filtered out as is well known. The portion of infrared radiation that is transmitted (greater than 65%, in the preferred embodiment) is focused by detector lens 113 onto infrared detector 116 and a temperature is calculated using circuitry as is well known. A portion of the incoming visible radiation received from target 160 is reflected and attenuated by beam splitter 150, as described above, and then reflected by mirror 155 into the scope lens system where it is focused for viewing by the operator. The portion of visible radiation passing through beam splitter 150 has no effect on the operation of IR detector 116. Similarly, the portion of infrared radiation reflected by beam splitter 150 has no impact on the operation of the scope lens system.

The operation of the laser focusing system will now be described. The output beam of a solid state laser 161 is coupled to the beam splitter assembly 120 and split into first and second laser beams 162 and 164 by beamsplitter 123. The first beam 162 is directed toward the target 160 and the second beam traverses openings 166 and 168 in the housing 112 to be reflected by the adjustable mirror element 140 as a reflected second beam 164r directed toward the target 160. Beam splitter 123 and adjustable mirror element 140 are designed to orient the direction of the first beam 162 and reflected second beam 164r to converge at the focal point of the detector lens or to points on the circumference of the measured spot. In the preferred embodiment, both beam splitter 123 and adjustable mirror element 140 are coupled to adjustment mechanisms, as are well known, for adjusting the vertical and azimuthal orientation of beams 162 and 164r. Accordingly, the operator can accurately position the IR temperature sensor 110 so that the IR radiated from the target 160 is focused on IR detector 116.

In the currently preferred embodiment a diode laser is utilized, having a wavelength of 630 nanometers (nm) and an average output power of less than 1 milliwatt (mW). This wavelength is highly visible so that high power is not required to allow the operator to view the spots. High power could possibly injure the eye. An alternative embodiment utilizing a laser having a wavelength of 670 nm, for example, may require increased power because those wavelengths are less visible to the human eye.

The integrated structure of the beam splitter assembly 120 provides several advantages. The rigid placement of the laser 161, and beam splitter assembly 120 provides for precise alignment of those parts and allows use of a small beam splitter 123, which in the preferred embodiment is a half-silvered mirror. Additionally, the functions of focusing the laser 161 and sinking heat generated by the laser are also performed by the integrated assembly 120.

A procedure for aligning the system will now be described. It is not sufficient merely to align housing 112 of IR thermometer 110 along it's axis of symmetry to determine the optical axis 111 of the IR imaging system because imperfections in the lens and mechanical misalignment often cause the optical axis to be displaced from the axis of symmetry of the housing. Accordingly, for a close focus instrument, a heat source, such as a blackbody emitter source, is provided at the focal point of the detector lens and the housing 112 is oriented so that the output signal from the detector is maximized. Thus, the optical axis 111 of the IR imaging system is aligned to pass through the heat source.

Next, the beam splitter assembly is adjusted by utilizing vertical and azimuthal adjustment mechanisms as are well known to direct the first beam to intersect the heat source target or a point on the circumference of the measured spot, and the mirror assembly is adjusted utilizing vertical and azimuthal adjustment mechanisms to position the reflected second beam to intersect the target or a spot on the circumference of the measured spot.

Finally, the scope lens system in the scope assembly is adjusted by using vertical and azimuthal adjustment mechanisms as are well known to direct the circle and cross-hair arrangement to intersect the heat source and/or laser beams 162 and 164r. As will be apparent to one skilled in the art, the order of alignment need not be strictly adhered to. The scope lens system may be aligned prior to alignment of the laser beams, for example.

Alternatively, for a divergent system using divergent beams and designed to define a focal spot for an instrument having a far focus (e.g., 50 feet to infinity), the beams 162 and 164r would be oriented to intersect a circle of a predetermined radius, as defined by the circle and cross-hair arrangement in the scope lens system, with the target spot at its center.

In the preferred embodiment, the system is divergent and defined to have a far focus with a distance-to-focal area ratio of about 180:1. At a distance of 180 inches from the sensor, for example, the focal area will be about 1 inch in diameter. For an accurate reading, the target object or area must fit within the focal area. The focal area, therefore, defines the perimeter of the target area necessary for an accurate reading.

An alternative embodiment of the invention will now be described with reference to FIG. 2. A remote infrared (IR) thermometer 210 includes a rectangular cylindrical housing 212 including a cavity 214 holding a detector lens 213, an infrared detector 216, and a detector focusing heatsink 215. A laser aiming system includes a laser aiming mirror element 240. A scope assembly includes a beam splitter 250, a mirror element 255 and a scope lens system including an eyepiece (not shown). The beam splitter 250, mirror element 255, lens system and laser aiming mirror element 240 will be described in detail below.

The operation of beam splitter 250 will now be described. Incoming radiation, depicted in FIG. 2 as incident radiation beam 280, includes both visible radiation, or light, reflected off of target 260, as well as infrared radiation emitted from target 260. When sensor 210 is pointed so that optical axis 211 intersects target 260, incoming radiation from target 260 traverses opening 270 in housing 212, and is incident on beam splitter 250. Beam splitter 250 is mounted in cavity 214 and is oriented so as to reflect a portion of incident radiation 280 through opening 275 in housing 212 as reflected radiation beam 280r. The remaining portion of incoming radiation 280 passes through beam splitter 250 as transmitted radiation beam 280t. Because the transmittance and reflectance properties of beam splitter 250 will vary depending on the wavelength (or frequency) of the incident radiation, the angle of orientation of beam splitter 250 with respect to incident radiation and the material forming beam splitter 250, beam 280r and beam 280t will comprise different amounts of visible radiation and infrared radiation.

Figure 2:
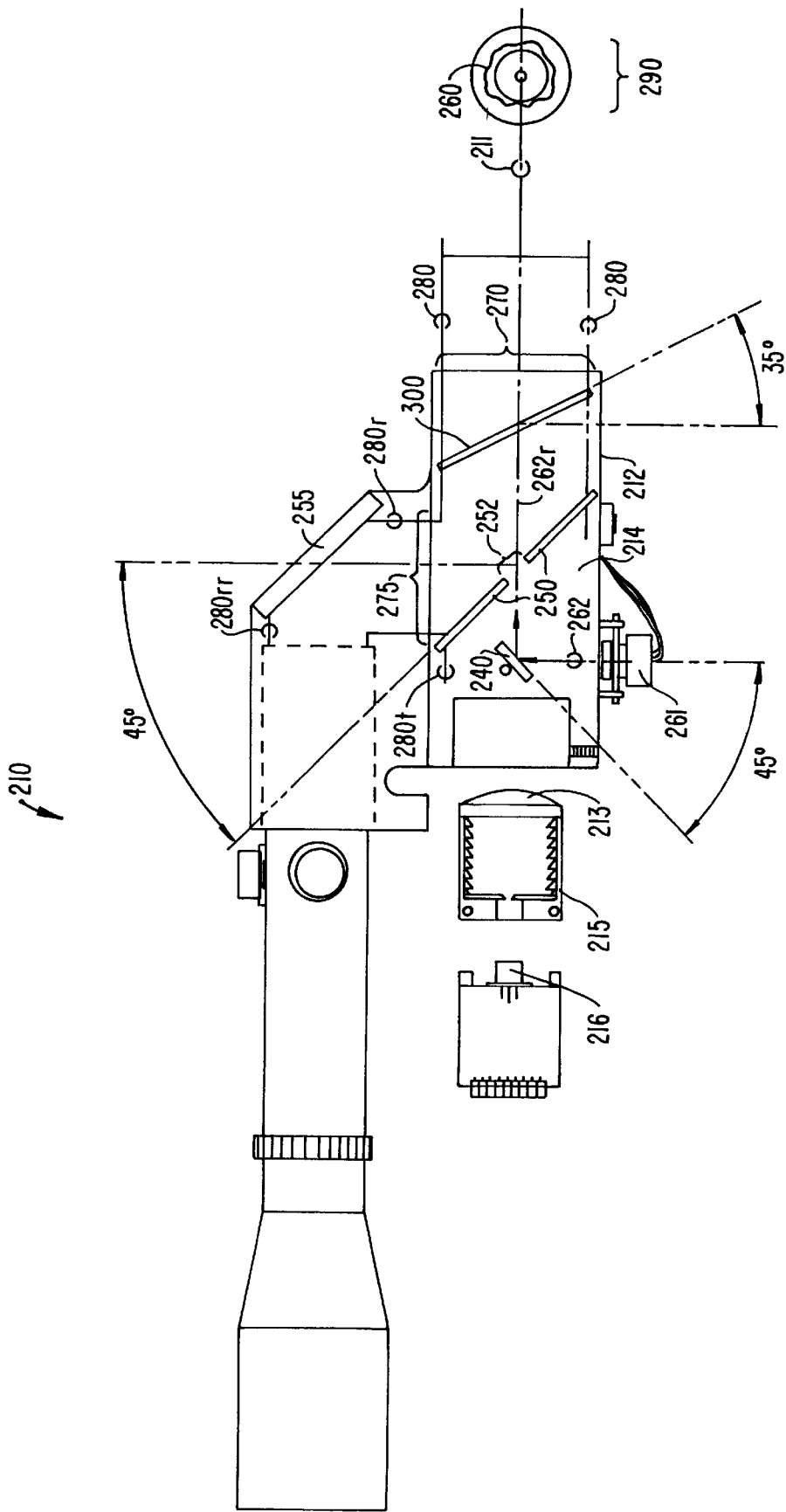
FIG. 2 depicts a cross-sectional view of an alternate preferred embodiment of an assembled system utilizing the principles of the present invention.

Beam splitter 250, in the alternate preferred embodiment, is made out of silicon and oriented at a 45 degree angle with respect to incident radiation beam 280 as shown in FIG. 2. At this angle, beam splitter 250 provides an average transmittance of greater than 65% for infrared radiation (7 to 14 micron wavelength) and an average reflectance of greater than 26% for visible radiation (0.4 to 0.7 micron wavelength). Therefore, in the alternate preferred embodiment, greater than 26% of the incident visible radiation received from target 260 is reflected through opening 275 toward mirror element 255 in beam 280r. Likewise, greater than 65% of the incident infrared radiation received from target 260 is transmitted or passed through beam splitter 250 in beam 280t.

Beam splitter 250 also includes a "cored-out" hole 252, or a bore, aligned along optical axis 211. Cored-out hole 252 allows laser beam 262r, reflected from laser aiming mirror 240 to pass unobstructed along optical axis 211 toward target 260. Preferably, the size of hole 252 is large enough to allow the entire laser beam 262r to pass through unobstructed.

The operation of laser aiming mirror 240 will now be described. Laser aiming mirror 240 is fixedly mounted in cavity 214 and is coupled to adjustment mechanisms for adjusting the vertical and azimuthal orientation of reflected beam 262r along optical axis 211. In the alternate preferred embodiment, laser aiming mirror 240 is circular in shape and has a diameter of approximately 0.3 inches. Laser aiming mirror 240 is mounted at approximately a 45 degree angle with respect to optical axis 211, as shown in FIG. 2. Due to the small size of mirror 240, blocking of infrared radiation in beam 280t is minimal. Further, IR sensor 210 is designed to compensate for any loss of infrared radiation caused by the placement of mirror 240 through the use of appropriate gain enhancing circuitry.

In the alternate preferred embodiment, mirror element 255 is oriented at 45 degrees from horizontal as shown in FIG. 2. Reflected beam 280r traverses opening 275 to be reflected by mirror element 255 as reflected beam 280rr directed toward the scope lens system (not shown). The scope lens system is designed to allow a user to view, through an eyepiece, the visible light received from target 260 and reflected by beam splitter 250 and mirror element 255. A circle and cross-hair arrangement 290, as well known in the art, is included in the scope lens system to allow the operator to align optical axis 211 of IR thermometer 210 with target 260. Furthermore, the scope lens system is designed to allow a user to view target 260 while either holding the sensor and scope housing at arms length or with the user's eye next to the eyepiece. This is accomplished by appropriate magnification and focusing in the scope lens system of light received from target 260. When the illuminating spot on target 260 is not visible to the naked eye, the scope can be used to magnify the focal area, thereby allowing accurate location of the spot. Accordingly, the operator can accurately position IR temperature sensor 210 so that the IR radiated from the target 260 is focused on IR detector 216.

In operation, when target 260 is aligned with optical axis 211 of sensor 210, infrared radiation emitted from target 260 and contained in incoming radiation beam 280 is focused by the detector lens 213 onto the surface of infrared detector 216. In the alternate preferred embodiment, the detector lens 213 is designed to provide focusing of the incident infrared radiation (7 to 14 micron wavelength). Any visible radiation passing through beam splitter 250 is filtered out as is well known. The portion of infrared radiation that is transmitted (greater than 65%, in the preferred embodiment) is focused by detector lens 213 onto infrared detector 216 and a temperature is calculated using circuitry as is well known. A portion of the incident visible radiation received from target 260 is reflected and attenuated by beam splitter 250, as described above, and then reflected by mirror 255 into the scope lens system where it is focused for viewing by the operator. The portion of visible radiation passing through beam splitter 250 has no effect on the operation of IR detector 216. Similarly, the portion of infrared radiation reflected by beam splitter 250 has no impact on the operation of the scope lens system.

The operation of the laser aiming system will now be described. The output beam 262 of a solid state laser 261 is reflected by mirror element 240 as a reflected beam 262r directed toward the target 260. Mirror element 240 positioned to direct reflected beam 262r along optical axis 211, through cored-out hole 252 in beam splitter 250, and toward target 260. Cored-out hole 252 is large enough to permit reflected laser beam 262r to pass unobstructed, but not so large as to substantially interfere with incoming radiation beam 280. That is, in this embodiment, the cross-section of laser beam 262r at cored-out hole 252 has a first diameter and cored-out hole 252 has a second diameter, wherein the second diameter is larger than the first diameter. In this embodiment, cored-out hole 252 is aligned along optical axis 211 and has a diameter of approximately 0.3 inches. Passing along the optical axis 211, reflected beam 262r intersects target 260 and creates a visible spot on target 260 when target 260 is aligned with optical axis 211. Accordingly, the operator can accurately position IR thermometer 210 so that the IR radiated from the target 260 is focused on IR detector 216.

Window element 300 may be fixedly mounted in cavity 214 to provide a seal for preventing dust and particulate matter from entering the system. Dust and particulate matter may lead to degradation of the component optics used in the system. Moreover, the angling of window 300 prevents internal reflections of reflected laser beam 262r. Internal reflections of beam 262r may lead to laser light entering into the scope lens system of the scope assembly, thereby potentially harming the operator's eyes. In the preferred embodiment, window 300 is mounted at a 35 degree angle relative to optical axis 211, as shown in FIG. 2.

In the alternate preferred embodiment a diode laser is used, having a wavelength of 630 nanometers (nm) and an average power output of less than 1 milliwatt (mW). This wavelength is highly visible so that high power is not required to allow the operator to view the spot. High power could possibly injure the eye. An alternative embodiment utilizing a laser having a wavelength of 670 nm, for example, may require increased power because those wavelengths are less visible to the human eye.

A procedure for aligning the system will now be described. It is not sufficient merely to align housing 212 of IR thermometer 210 along it axis of symmetry to determine the optical axis 211 of the IR imaging system because imperfections in the lens and mechanical misalignment often cause the optical axis to be displaced from the axis of symmetry of the housing. Accordingly, for a close focus instrument, a heat source, such as a blackbody emitter source, is provided at the focal point of the detector lens and the housing 212 is oriented so that the output signal from the detector is maximized. Thus, the optical axis 211 of the IR imaging system is aligned to pass through the heat source.

Next, the laser aiming system is adjusted by using vertical and azimuthal adjustment mechanisms as are well known coupled to laser aiming mirror 240 to direct reflected beam 262r to intersect the heat source target.

Finally, the scope lens system in the scope assembly is adjusted by using vertical and azimuthal adjustment mechanisms as are well known to direct the circle and cross-hair arrangement 290 to intersect the heat source and/or laser beam 262r. As will be apparent to one skilled in the art, the order of alignment need not be strictly adhered to. The scope lens system may be aligned prior to alignment of the laser aiming system, for example.

Alternatively, for a divergent system designed to define a focal spot for an instrument having a far focus (e.g., 50 feet to infinity), the beam 262r would be oriented to intersect the center of the circle of a predetermined radius, as defined by the circle and cross-hair arrangement in the scope lens system, with the target spot at its center.

In the alternate preferred embodiment, the system is divergent and defined to have a far focus with a distance-to-focal area ratio of about 180:1. At a distance of 180 inches from the sensor, for example, the focal area will be about 1 inch in diameter. For an accurate reading, the target object or area must fit within the focal area. The focal area, therefore, defines the perimeter of the target necessary for an accurate reading.

The invention has now been described with reference to the preferred embodiments. Alternatives and substitutions will now be apparent to persons of ordinary skill in the art. For example, although the preferred embodiment utilizes a diode laser, in certain circumstances the substitution of a semiconductor diode laser or a high power LED may be appropriate. Additionally, adjustment mechanisms such as a cam may be utilized to adjust the vertical and azimuthal orientation of the beams. Further, a focusing mirror rather than a lens could also be utilized to focus the IR radiation and a prism rather than a beam splitter could be utilized to split incident radiation. Accordingly, it is not intended to limit the invention except as provided by the appended claims.

What is claimed is:

1. A temperature measuring device for measuring the temperature of a distant target area, the device comprising:
   an infrared (IR) temperature sensor including an IR detector and a first focusing element for focusing IR radiation, wherein said first focusing element focuses incoming IR radiation emitted from the target onto said IR detector;
   a scope including an eyepiece and a second focusing element for focusing visible radiation, wherein said second focusing element focuses incoming visible radiation reflected from the target onto said eyepiece;
   a visible light source for emitting a visible beam of light, with said visible beam of light being incident upon the target;
   a beamsplitter for transmitting a portion of said incoming IR radiation and reflecting a portion of said incoming visible radiation, with said transmitted IR portion being incident upon said IR detector, wherein said beamsplitter includes an opening; and
   a first mirror element for directing said beam of visible light toward the target, wherein said beam of visible light is incident upon said first mirror element and wherein said first mirror element reflects said visible beam of light through said opening and toward the target.

2. The temperature measuring device of claim 1, wherein said visible light source is a laser.

3. The temperature measuring device of claim 2, wherein said laser is a solid state laser.

4. The temperature measuring device of claim 1, further comprising circuitry coupled to said IR detector for determining the temperature of the target based on the IR radiation focused onto said detector.

5. The temperature measuring device of claim 1, wherein said eyepiece focuses said visible radiation for viewing by a user at arms length from said eyepiece.

6. The temperature measuring device of claim 1, wherein said incoming IR radiation includes a wavelength in the range of about 7 microns to about 14 microns.

7. The temperature measuring device of claim 1, wherein said incoming visible radiation includes a wavelength in the range of about 0.4 microns to about 0.7 microns.

8. The temperature measuring device of claim 1, further comprising:

a second mirror element for directing visible light toward said second focusing element, wherein said reflected visible portion is incident upon said second mirror element and wherein said second mirror element reflects said visible portion toward said second focusing element.

9. An infrared temperature sensor, comprising:

an elongated body having an interior cavity surrounded by a body surface, with said interior cavity defining an optical axis, and with said body having a first opening at one end disposed along said optical axis and a second opening disposed on said body surface;

a first mirror fixedly mounted in said body and disposed along said optical axis, for reflecting an incident beam of light through said first opening and toward a focal area external to said body and disposed along said optical axis;

a beam splitter fixedly mounted in said body and disposed along said optical axis, for splitting incident radiation received through said first opening from said focal area into first and second portions, with said beam splitter having a third opening centrally disposed along said optical axis, with said reflected beam of light passing through said third opening, with said first portion of said incident radiation passing through said beam splitter along said optical axis and said second portion of said incident radiation being directed through said second opening, with said incident radiation including infrared radiation and visible radiation;

an infrared radiation sensor, located within said body and comprising a first focusing element and a detector, with said first focusing element for focusing said infrared radiation emitted from said focal area, and with said detector for receiving said first portion of said incident radiation; and a scope assembly, mounted on said body at said second opening and comprising a second focusing element and a second mirror, for viewing visible radiation received from said focal area, with said second focusing element for focusing said visible radiation reflected from said focal area, and with said second mirror reflecting said second portion of said incident radiation toward said second focusing element.

10. The infrared temperature sensor of claim 9, further comprising a window mounted in said body and disposed along said optical axis between said beam splitter and said first opening.

11. The infrared temperature sensor of claim 10, wherein said window seals said first opening and prevents particulate matter from entering said interior cavity.

12. The infrared temperature sensor of claim 9, wherein said beam of light has a cross-section having a first diameter, wherein said third opening has a second diameter, and wherein said second diameter is larger than said first diameter.

* * * * *